United States Patent [19]

EerNisse et al.

[11] Patent Number: 4,535,638
[45] Date of Patent: Aug. 20, 1985

[54] RESONATOR TRANSDUCER SYSTEM WITH TEMPERATURE COMPENSATION

[75] Inventors: Errol P. EerNisse, Sandy; Roger W. Ward, Salt Lake City, both of Utah

[73] Assignee: Quartztronics, Inc., Salt Lake City, Utah

[21] Appl. No.: 538,171

[22] Filed: Oct. 3, 1983

[51] Int. Cl.³ ............................ G01L 1/10; G01L 1/16
[52] U.S. Cl. ............................ 73/862.59; 73/DIG. 4; 310/338; 374/117
[58] Field of Search ............... 73/DIG.1, DIG.4, 702, 73/703, 862.59, 581; 374/117; 310/338, 366; 331/37, 163

[56] References Cited

U.S. PATENT DOCUMENTS

| | | | |
|---|---|---|---|
| 3,879,992 | 4/1975 | Bartera | 310/312 X |
| 4,144,747 | 3/1979 | Datwyler, Jr. | 73/DIG. 4 |
| 4,175,243 | 11/1979 | Corbett | 310/338 |
| 4,297,872 | 11/1981 | Ikeda et al. | 73/702 X |

*Primary Examiner*—Charles A. Ruehl
*Attorney, Agent, or Firm*—Thorpe, North & Western

[57] ABSTRACT

A method and apparatus for measuring force or other parameters and temperature. The apparatus includes an oscillator and a vibratory element, such as a quartz crystal, which is caused to resonate by the oscillator at two frequencies $f_1$ and $f_2$ selected from the fundamental frequency and its overtone frequencies of the vibratory element. The vibratory element is selected so that the two frequencies $f_1$ and $f_2$ both vary with variation in force (or other parameter) applied to the element and with variation in temperature of the element, and so that the magnitude or scale factor of variation for frequency $f_1$ is different from that for frequency $f_2$. The apparatus also includes a detection device for detecting the frequencies $f_1$ and $f_2$ and for producing signals representing the frequency variation of the two frequencies relative to a reference frequency, and a processor for processing the signals produced by the detector device for determining the force (or other parameter) and temperature to which the vibratory element is subjected.

32 Claims, 4 Drawing Figures

RESONATOR TRANSDUCER SYSTEM WITH TEMPERATURE COMPENSATION

BACKGROUND OF THE INVENTION

This invention relates to a resonator transducer for simultaneously measuring force or gas density, and temperature.

Resonator systems for measuring various force parameters such as pressure, acceleration, weight, resonator surface film stress, etc., and other parameters such as density of the medium in which the systems are placed are well known. Typically such systems include a vibratory element whose frequency of resonation varies with variation in the force parameter or other parameter to which the vibratory element is subjected, an oscillator for causing the vibratory element to resonate, and processing circuitry for determining the variation in frequency of resonation of the vibratory element and thus the variation in the parameter to which the vibratory element is subjected.

It is also known that the frequency of resonation of most vibratory elements is affected by the temperature to which the vibratory element is exposed. Thus, errors may be introduced in the measurement of force or other parameters by resonator transducer systems as a result of temperature variations. Such errors can be significant and can seriously affect the accuracy of any measurements made.

There are a number of approaches for compensating for temperature variation when making force parameter measurements with vibratory element resonator transducers. One way is measuring temperature with a conventional analog temperature sensor and then using analog to digital conversion to provide digital temperature information. See for example G. R. Cucci, U.S. Pat. No. 4,311,053. One disadvantage of this approach is the need for both frequency and analog measurements and analog to digital conversion.

The most common approach for quartz crystal vibratory elements appears to be the utilization of two quartz crystal resonators, both of which are exposed to the operating environment (temperature), but only one of which is subjected to the force parameter to be measured. The output of the resonator exposed only to temperature is used to correct or compensate for temperature induced errors in the force parameter measurements made by the other resonator. See, for example, E. P. EerNisse, "Vacuum Applications of Quartz Resonators", *Journal of Vacuum Science and Technology*, Vol. 12, No. 1, Jan./Feb., 1975, pages 564–568; and H. E. Karrer and J. Leach, U.S. Pat No. 3,561,832, issued Feb. 9, 1971. The disadvantage of this approach is that the two resonators cannot be in precisely the same physical location and thus will not be exposed to precisely the same temperature. Also, unless the resonators are exactly the same in dimension, characteristics, etc., they will not respond in exactly the same way to temperature variation, and yet such exactness in response is necessary to accurately compensate for temperature variation.

Another proposed approach for compensating for, or at least determining, temperature variations in quartz resonator transducers is that a single quartz crystal be used in two different modes of oscillation. See J. A. Kusters and J. Leach, "Dual Mode Operation of Temperature and Stress Compensated Crystals", *Proc.* 32nd Annual Symp. on Frequency Control, 1978, pages 389–397. Here, a single crystal is driven by an oscillator to resonate in the so-called fast-shear mode or "B" mode, and also in the slow-shear mode or "C" mode. In the C mode, the frequency of oscillation of the crystal is fairly temperature independent whereas in the B mode, the frequency of oscillation varies with variation in temperature. The so-called dual mode oscillator arrangement was proposed not for force parameter measurement with temperature compensation, but rather for producing an output signal frequency which is temperature compensated. Among the disadvantages of this arrangement are the difficulty in driving a crystal in both the B and C modes simultaneously and the consequent requirement of a more complicated oscillator driver, the problems created by the closeness of the frequencies of the B and C modes and the attendant requirement of very precise filters to eliminate cross talk, and the errors which can be introduced using the B mode of oscillation which has what are termed "activity dips" (spurious frequency responses at certain temperatures). The closeness of the frequencies of the B and C modes also causes phase noise in the C mode frequency output when the B mode is resonating.

SUMMARY OF THE INVENTION

It is an object of the invention to provide a new and improved apparatus and method for compensating for temperature variation in resonator transducers.

It is another object of the invention to provide a simple and yet accurate method and apparatus for temperature correction in resonator transducers.

It is a further object of the invention to provide temperature compensation in a single resonator transducer.

It is also an object of the invention to provide a single resonator transducer capable of measuring both force or other parameters and temperature to thereby compensate for either temperature introduced errors or force or other parameter introduced errors.

The above and other objects of the invention are realized in a specific illustrative embodiment of a resonator transducer system which includes a vibratory element such as a crystal which resonates at least two frequencies $f_1$ and $f_2$ selected from the fundamental frequency and its overtone frequencies in response to an oscillatory electrical signal. The crystal is selected so that the two frequencies $f_1$ and $f_2$ both vary with variation in force (or other parameter such as density of the medium surrounding the crystal) applied to the crystal and with variation in temperature to which the crystal is exposed, with the magnitude or scale factor of variation for one of the selected frequencies being different from that for the other selected frequency. Also included is an oscillator for causing the crystal to resonate at the two frequencies, detection apparatus for detecting the two frequencies of resonance of the crystal and for producing signals $V_1$ and $V_2$ representing the two selected frequencies, and a processor responsive to the signals $V_1$ and $V_2$ for producing a signal F representing the force (or other parameter) applied to the crystal and a signal T representing the temperature to which the crystal is exposed. The force measurement is compensated for temperature variations in the crystal and the temperature measurement is compensated for variations in the force applied to the crystal.

Advantageously, the crystal is adapted to resonate in a mode which is free of significant activity dips in both the selected frequencies. It has been found that this is the case for the C mode of vibration for SC-cut quartz crystals and to a lesser extent for the C mode of AT-cut quartz crystals and the B mode of BT-cut quartz crystals. Other crystal configurations which have been found suitable for producing the two desired frequencies $f_1$ and $f_2$ are a double-bar, double-ended arrangement resonating in a flexure mode (see U.S. Pat. No. 4,372,173) and a double-bar, single-ended arrangement also resonating in the flexure mode for measuring fluid density of the surrounding medium (see copending U.S. application, Ser. No. 506,314.)

In accordance with one aspect of the invention, a pair of filters are connected in parallel with each other between the crystal and the oscillator, with one filter being designed to pass signals having frequencies in a band generally centered about the frequency $f_1$ and the other filter being designed to pass signals having frequencies in a band centered about the frequency $f_2$. A similar pair of filters advantageously are connected in parallel with each other between the oscillator and the frequency detection apparatus.

Because a single crystal is used, the two modes of oscillation used—frequency $f_1$ and frequency $f_2$—are exposed to the same environment, thus removing any error which may be introduced by using two crystals. Also, the oscillator driver for causing the crystal to resonate in the two frequency modes is simple in construction and the two modes of resonance are free of significant activity dips which could cause spurious readings.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
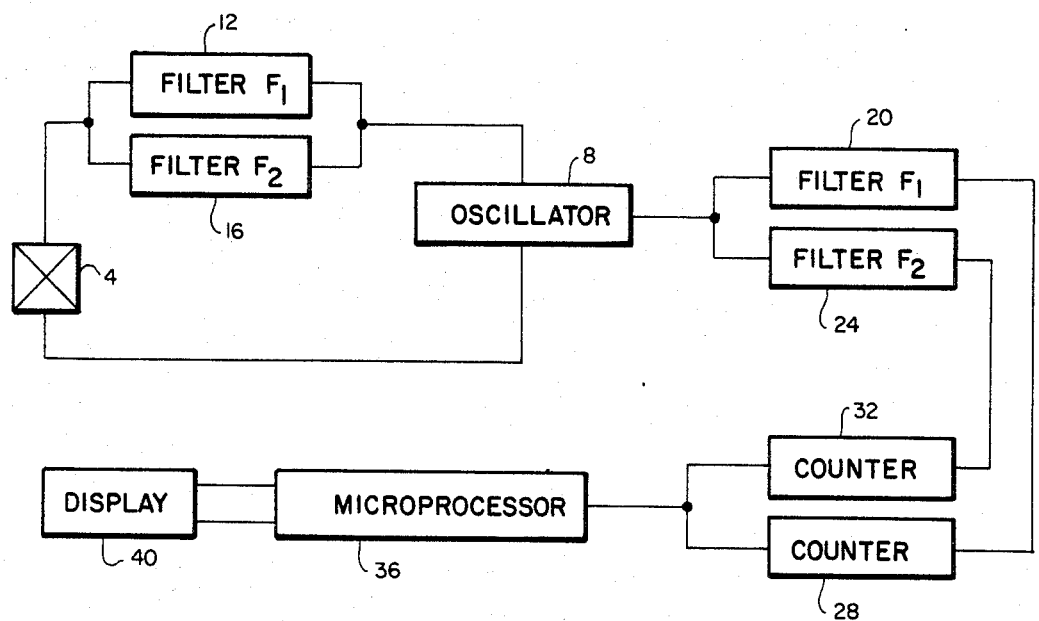
FIG. 1 is a schematic view of a resonator transducer system made in accordance with the principles of the present invention and utilizing a single oscillator driver.

Referring to FIG. 1, there is shown a resonator transducer system capable of measuring a force parameter (which will hereafter be referred to simply as "force") and temperature in accordance with the present invention. The system includes a vibrating element 4 adapted to resonate free of significant activity dips. It has been found that for the thickness shear mode of vibration, the SC-cut, AT-cut and BT-cut quartz crystals meet this criterion, and that SC-cut quartz crystals are preferred because they are more stable in transient temperature environments and have better short term frequency stability. In addition, the flexure mode of vibration, among others, in both the double-bar, double-ended resonator configuration (see U.S. Pat. No. 4,372,173) and the double-bar, single ended configuration (see copending U.S. patent application, Ser. No. 506,314) have been found to meet this criterion.

An oscillator 8 is coupled to the crystal 4 by way of a pair of filters 12 and 16 which are connected in parallel with each other. The oscillator 8 produces an oscillatory signal which is supplied via the filters 12 and 16 to the crystal 4 to cause the crystal to resonate at two (or more) frequencies $f_1$ and $f_2$ selected from the fundamental frequency and its overtone frequencies. Filter 12 passes oscillatory signals whose frequencies are within a band of frequencies centered about the first selected frequency $f_1$, whereas filter 16 passes oscillatory signals having frequencies in a band centered about the second selected frequency $f_2$. The frequencies at which the crystal 4 resonates are dependent both upon the force (such as pressure) to which the crystal is subjected, and the temperature to which the crystal is exposed. The crystal is selected and formed so that the variation in the first selected frequency with a change in temperature is by a different scale factor from that at which the second selected frequency varies with variation in temperature. See, for example, A. R. Chi, Temperature Behavior of AT-cut Quartz Resonators", *Proc. 10th Annual Symp. on Frequency Control*, 1956, pages 47–59. The same is also true for variations in force applied to the crystal 4. It is this phenomenon which is utilized in a unique and yet simple fashion for producing both force (or other parameter) and temperature measurements using a single crystal resonator transducer, or alternatively for producing a force measurement which is temperature corrected or a temperature measurement which is force corrected.

The oscillator 8 follows the frequency of oscillation of the crystal 4 and produces a signal having the same two selected frequencies as the crystal and this signal is supplied to a second pair of filters 20 and 24. Filter 20 passes signals having frequencies in a band generally centered about the first selected frequency $f_1$ and filter 24 passes signals having frequencies in a band generally centered about the second selected frequency $f_2$. Filter 20 supplies its frequency signal to a counter 28 and filter 24 supplies its signal to a counter 32. Counter 20 produces a digital output signal representing the first selected frequency of the received signal and counter 32 produces a digital output signal representing the second selected frequency of the received signal. These digital outputs are supplied to a microprocessor 36 which processes the signals to determine the magnitude of the force applied to the crystal 4, and the temperature to which the crystal is exposed. The force and temperature measurements are supplied to a display unit 40 where the measurements are visually displayed. The oscillator 8, filters 12, 16, 20 and 24, counters 28 and 32, microprocessor 36 and display 40 are all conventional units.

The change in the two selected frequencies (preferably the fundamental and third overtone frequencies or fundamental and fifth overtone frequencies) with force and temperature can be characterized by algebraic equations as follows:

$$s_1 = \frac{f_1 - f_{01}}{f_{01}} = A_1 T + B_1 T^2 + C_1 T^3 + \qquad (1)$$

$$D_1 F + E_1 F^2 + F_1 FT + \ldots$$

and $$s_2 = \frac{f_2 - f_{02}}{f_{02}} = A_2 T + B_2 T^2 + C_2 T^3 + \qquad (2)$$

$$D_2 F + E_2 F^2 + F_2 FT + \ldots.$$

where $f_{01}$ and $f_{02}$ are the first and second selected frequencies at a predetermined reference temperature $T_0$ and reference force $F_0$. Also, T is the change in temperature from the reference temperature and F is the change in force (or other parameter) from the reference force to which the crystal is subjected. The inverses of these equations are:

$$F = a_F s_1 + b_F s_1{}^2 + c_F s_1{}^3 + d_F s_2 + \\ e_F s_2{}^2 + f_F s_2{}^3 + g_F s_1 s_2 + \ldots, \quad (3)$$

and $$T = a_T s_1 + b_T s_1{}^2 + c_T s_1{}^3 + d_T s_2 + \\ e_T s_2{}^2 + f_t s_2{}^3 + g_T s_1 s_2 + \ldots, \quad (4)$$

where $a_F$, $b_F$, $c_F$, $d_F$, $e_F$, $f_F$ are predetermined constant force coefficients, and where $a_T$, $b_T$, $c_T$, $d_T$, $e_T$, $f_T$ and $g_T$ are predetermined constant temperature coefficients.

The coefficients in the equations (3) and (4) are readily determined by applying known forces and temperatures to the crystal and determining the constant coefficients in the equations by curve fitting the equations to the known data. With the coefficients being determined, and having two equations and two unknowns, the two unknowns can be readily determined by conventional processing techniques. In effect, equations (3) and (4) are solved by the microprocessor 36 to produce a measure of force F and temperature T which are both self-compensated. Other parameters such as fluid density, along with temperature, could be determined in a similar fashion.

Figure 2:
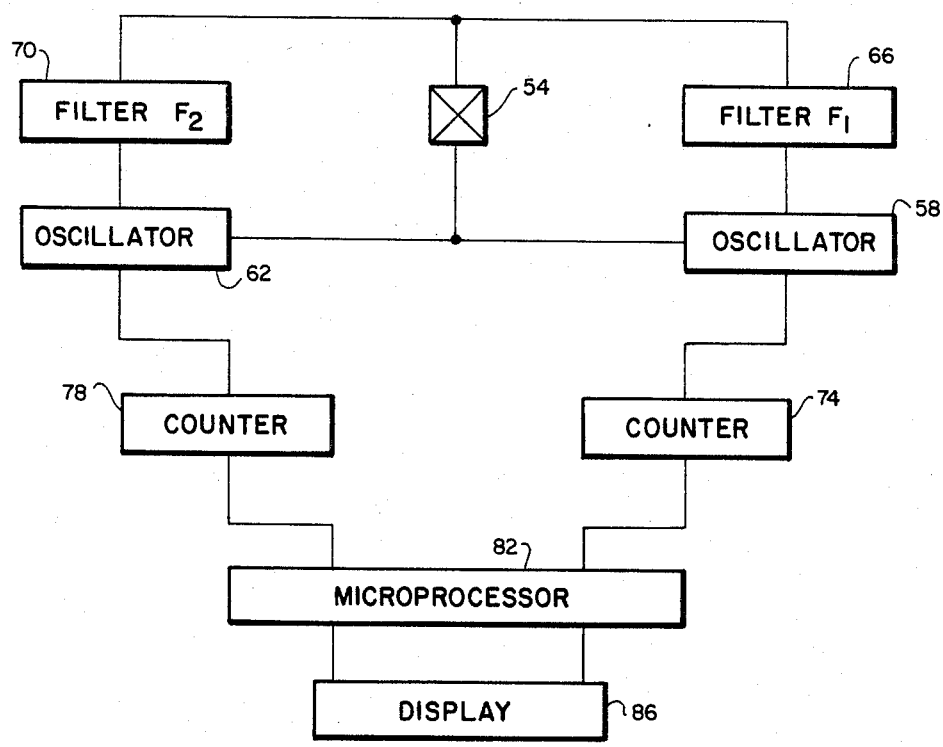
FIG. 2 is a schematic view of another embodiment of the invention which utilizes two oscillator drivers.
Figure 3:
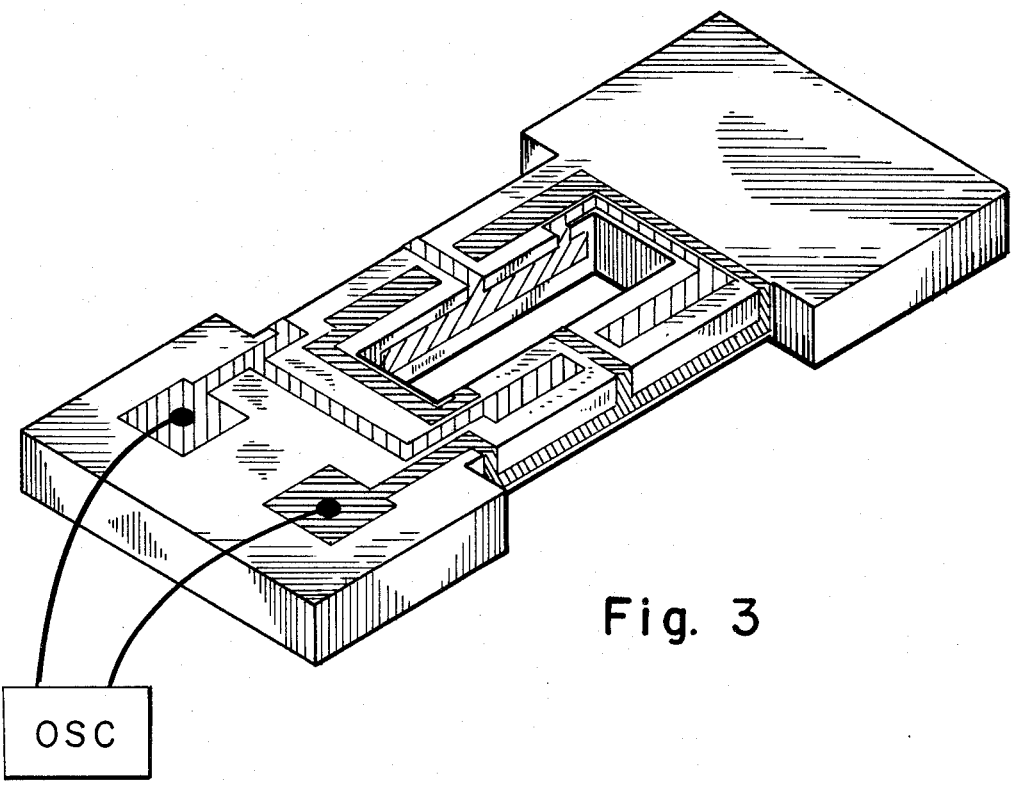
FIG. 3 is a perspective, fragmented view of a double-bar, double-ended resonator adapted to oscillate in the flexure mode.
Figure 4:
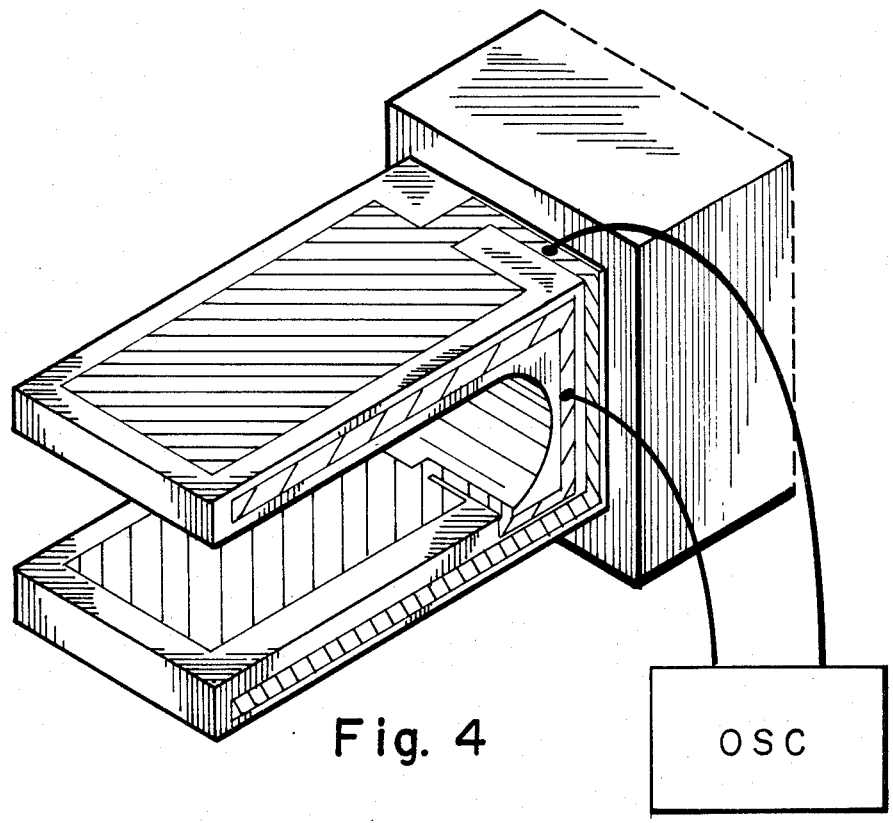
FIG. 4 is a perspective, fragmented view of a double-bar, single-ended resonator adapted to oscillate in the flexure mode.

FIG. 2 shows another embodiment of the invention which includes a single crystal 54 driven by two oscillators 58 and 62 to resonate at two selected frequencies $f_1$ and $f_2$. Filters 66 and 70 are coupled in series respectively to oscillators 58 and 62 to pass signal frequencies $f_1$ and $f_2$ to the crystal 54 to thereby cause the crystal to resonate at these frequencies. The oscillators 58 and 62 follow respectively the frequencies of oscillation $f_1$ and $f_2$ of the crystal 54 to produce and supply to counters 74 and 78 oscillatory signals having frequencies $f_1$ and $f_2$. The counters 74 and 78, in turn, produce digital output signals representing frequencies $f_1$ and $f_2$ respectively, and these signals are supplied to a microprocessor 82. The microprocessor 82 processes the signals, as in the FIG. 1 embodiment, to determine the force (or other parameter being measured) and temperature for visual display on display unit 86. The processing is carried out in the same fashion as described for the FIG. 1 embodiment.

What is claimed is:

1. A resonator transducer system comprising a single vibratory element which is responsive to an oscillatory electrical signal for resonating at frequencies $f_1$ and $f_2$, selected from the fundamental frequency and overtone frequencies of the vibratory element, where the two frequencies vary with variation in force or other parameter applied to the vibratory element and with variation in temperature to which the vibratory element is exposed, with the magnitude of variation due to the change in temperature for frequency $f_1$ being different from that for frequency $f_2$, means for applying an oscillatory signal to the vibratory element to cause the vibratory element to resonate and for producing a vibratory signal having a frequency $f_1$ and a frequency $f_2$ which follow the selected frequencies $f_1$ and $f_2$ respectively of the vibratory element, and processing means responsive to the frequencies $f_1$ and $f_2$ of the vibratory signal produced by the oscillator means for producing a first signal representing the force or other parameter applied to the vibratory element, and a second signal representing the temperature to which the vibratory element is subjected.

2. A resonator transducer system as in claim 1 wherein said vibratory element is caused to resonate in modes substantially free of activity dips.

3. A resonator transducer system as in claim 1 wherein the vibrating element is a quartz crystal.

4. A resonator transducer system as in claim 3 wherein said crystal is caused to resonate in thickness shear modes.

5. A resonator transducer system as in claim 4 wherein said crystal is an SC-cut quartz crystal.

6. A resonator transducer system as in claim 4 wherein said crystal is an AT-cut quartz crystal.

7. A resonator transducer system as in claim 4 wherein said crystal is a BT-cut quartz crystal.

8. A resonator transducer system as in claim 3 wherein said crystal is a double-bar, double-ended resonator which vibrates in flexure modes.

9. A resonator transducer system as in claim 3 wherein said crystal is a double-bar, single-ended resonator which vibrates in flexure modes.

10. A resonator transducer system as in claim 1 further including a first filter means and second filter means connected in parallel with each other between the vibratory element and the oscillator means, said first filter means being adapted to pass oscillatory signals having frequencies in a band generally centered about the frequency $f_1$, and said second filter means being adapted to pass oscillatory signals having frequencies in a band generally centered about the frequency $f_2$.

11. A resonator transducer system as in claim 10 wherein said frequency $f_1$ is the fundamental frequency of vibration of the vibratory element and said frequency $f_2$ is the third overtone of the fundamental frequency.

12. A resonator transducer system as in claim 10 wherein said frequency $f_1$ is the fundamental frequency of vibration of the vibratory element, and said frequency $f_2$ is the fifth overtone of the fundamental frequency.

13. A resonator transducer system as in claim 10 wherein said frequency $f_1$ is the third overtone of the fundamental frequency of vibration of the vibratory element, and said frequency $f_2$ is the fifth overtone of the fundamental frequency.

14. A resonator transducer system as in claim 10 further including third filter means and fourth filter means connected in parallel with each other between the oscillator means and the processing means, said third filter means being adapted to pass oscillatory signals having frequencies in a band generally centered about the frequency $f_1$, and said second filter means being adapted to pass oscillatory signals having frequencies in a band generally centered about the frequency $f_2$.

15. A resonator transducer system as in claim 14 wherein said processing means includes first counting means coupled to the third filter means for producing a first signal $s_1$ indicative of the frequency change relative to a reference frequency of the oscillatory signal received from the third filter means, second counting means coupled to the fourth filter means for producing a second signal $s_2$ indicative of the frequency change relative to a reference frequency of the oscillatory signal received from the fourth filter means, and means for producing signals $$F = a_F s_1 + b_F s_1^2 + c_F s_1^3 + d_F s_2 + e_F s_2^2 + f_F s_2^3 + g_F s_1 s_2 + \ldots,$$

and $$S = a_T s_1 + b_T s_1^2 + c_T s_1^3 + d_T s_2 + e_T s_2^2 + f_T s_2^3 + g_T s_1 s_2 + \ldots,$$

where $a_F$, $b_F$, $c_F$, $d_F$, $e_F$, $f_F$ and $g_F$ are predetermined constant force or other parameter coefficients, and where $a_T$, $b_T$, $C_T$, $d_T$, $e_T$, $f_T$ and $g_T$ are predetermined constant temperature coefficients.

16. A resonator force transducer system with temperature self-compensation comprising
    a vibratory element which resonates at a first selected frequency $f_1$ and a second selected frequency $f_2$ in response to an oscillatory electrical signal, said frequencies varying by different scale factors with variation in force applied to the vibratory element and variation in temperature to which the vibratory element is exposed,
    means for causing said vibratory element to resonate at the frequencies $f_1$ and $f_2$,
    means for detecting the frequency $f_1$ and frequency $f_2$ of resonance of the vibratory element and for producing a signal $$s_1 = \frac{f_1 - f_{01}}{f_{01}},$$

and a signal $$s_2 = \frac{f_2 - f_{02}}{f_{02}},$$

where $f_{01}$ is the first selected frequency of vibration of the vibratory element at a predetermined reference force $F_0$ and reference temperature $T_0$, and where $f_{02}$ is the second selected frequency of vibration of the vibratory element at the reference force and temperature, and
    processing means responsive to signals $s_1$ and $s_2$ for producing a signal F representing the change in force applied to the vibratory element from the reference force, corrected for temperature variations.

17. A resonator system as in claim 16 wherein the vibratory element is a quartz crystal.

18. A resonator force transducer system as in claim 17 wherein said resonation causing means comprises an oscillator.

19. A resonator force transducer system as in claim 18 further including a first filter means and second filter means connected in parallel with each other between the crystal and the oscillator, said first filter means being adapted to pass oscillatory signals having frequencies in a band generally centered about the frequency $f_1$, and said second filter means being adapted to pass oscillatory signals having frequencies in a band generally centered about the frequency $f_2$.

20. A resonator force transducer system as in claim 19 wherein said processing means includes means for producing signals $$F = a_F s_1 + b_F s_1^2 + c_F s_1^3 + d_F s_2 + e_F s_2^2 + f_F s_2^3 + g_F s_1 s_2 + \ldots,$$

and $$T = a_T s_1 + b_T s_1^2 + c_T s_1^3 + d_T s_2 + e_T s_2^2 + f_T s_2^3 + g_T s_1 s_2 + \ldots,$$

where $a_F$, $b_F$, $c_F$, $d_F$, $e_F$, $f_F$ and $g_F$ are predetermined constant force coefficients, where $a_T$, $b_T$, $c_T$, $d_T$, $e_T$, $f_T$ and $g_T$ are predetermined constant temperature coefficients, and where T is the change in temperture from the reference temperature $T_0$.

21. A resonator force transducer system as in claim 17 wherein said resonation causing means comprises a first oscillator coupled to the crystal for causing the crystal to resonate at the frequency $f_1$, and a second oscillator coupled to the crystal for causing the crystal to resonate at the frequency $f_2$.

22. A resonator force transducer system as in claim 21 further including a first filter means coupled between the first oscillator and the crystal, said first filter means being adapted to pass oscillatory signals having frequencies in a band generally centered about the frequency $f_1$, and a second filter means coupled between the second oscillator and the crystal, said second filter means being adapted to pass oscillatory signals having frequencies in a band generally centered about the frequency $f_2$.

23. A resonator force transducer system as in claim 22 wherein said first and second oscillators cause said crystal to oscillate in thickness shear modes.

24. A resonator force transducer system as in claim 23 wherein said crystal is selected from a group consisting of SC-cut, AT-cut and BT-cut quartz crystals.

25. A resonator force transducer system as in claim 24 wherein said processing means includes means for producing signals $$F = a_F s_1 + b_F s_1^2 + c_F s_1^3 + d_F s_2 + e_F s_2^2 + f_F s_2^3 + g_F s_1 s_2 + \ldots,$$

and $$T = a_T s_1 + b_T s_1^2 + c_T s_1^3 + d_T s_2 + e_T s_2^2 + f_T s_2^3 + g_T s_1 s_2 + \ldots,$$

where $a_F$, $b_F$, $c_F$, $d_F$, $e_F$, $f_F$, and $g_F$ are predetermined constant force coefficients, where $a_T$, $b_T$, $c_T$, $d_T$, $e_T$, $f_T$ and $g_T$ are predetermined constant temperature coefficients, and where T is the change in temperature from the reference temperature $T_O$.

26. A resonator force transducer as in claim 22 wherein said crystal is a double-bar, double-ended resonator configuration, and wherein said first and second oscillators cause said crystal to oscillate in flexure modes.

27. A resonator force transducer as in claim 22 wherein said crystal is a double-bar, single-ended resonator configuration, and wherein said first and second oscillators cause said crystal to oscillate in flexure modes.

28. A resonator transducer system for determining force or other parameter and temperature comprising
    a single vibratory element which is responsive to an oscillatory electrical signal for resonating at frequencies $f_1$ and $f_2$, with the frequencies being selected from the group of frequencies consisting of the fundamental and overtone frequencies of the vibratory element, where the two frequencies vary with variation in force or other parameter applied to the vibratory element and with variation in temperature to which the vibratory element is exposed, with the magnitude of variation of frequency $f_1$ due to the change in force or other parameter or the change in temperature being different from that for frequency $f_2$, means for applying an oscillatory signal to the vibratory element to cause the vibratory element to resonate and for producing a vibratory signal having frequencies $f_1$ and $f_2$ which follow the selected frequencies of resonance $f_1$ and $f_2$ respectively of the vibratory element, and processing means responsive to the frequencies $f_1$ and $f_2$ of the vibratory signal for producing a first signal representing the force or other parameter applied to the vibratory element and a second signal representing the temperature to which the vibratory element is subjected.

29. A resonator transducer system as in claim 28 wherein the vibratory element is caused to resonate in modes substantially free of activity dips.

30. A resonator transducer system as in claim 29 wherein the vibratory element is a quartz crystal.

31. A resonator transducer system as in claim 30 wherein the crystal is selected from the group of crystals consisting of SC-cut, AT-cut and BT-cut quartz crystals.

32. A resonator transducer system as in claim 30 wherein the crystal is selected from the group consisting of a double-bar, double-ended resonator configuration or a double-bar, single-ended configuration, and wherein the crystal is caused to resonate in flexure modes.

* * * * *